3,306,031
VALVE CONTROL DEVICES, IN PARTICULAR
FOR GAS TURBINE POWER PLANTS
Auguste Moiroux, Lyons, and Edmond Salel, Meyzieux,
France, assignors to Société d'Etudes et de Participations, Eau, Gaz, Electricité, Energie, S.A., Geneva
(Switzerland)
Filed June 4, 1964, Ser. No. 372,622
Claims priority, application France, July 3, 1963,
940,267
4 Claims. (Cl. 60—13)

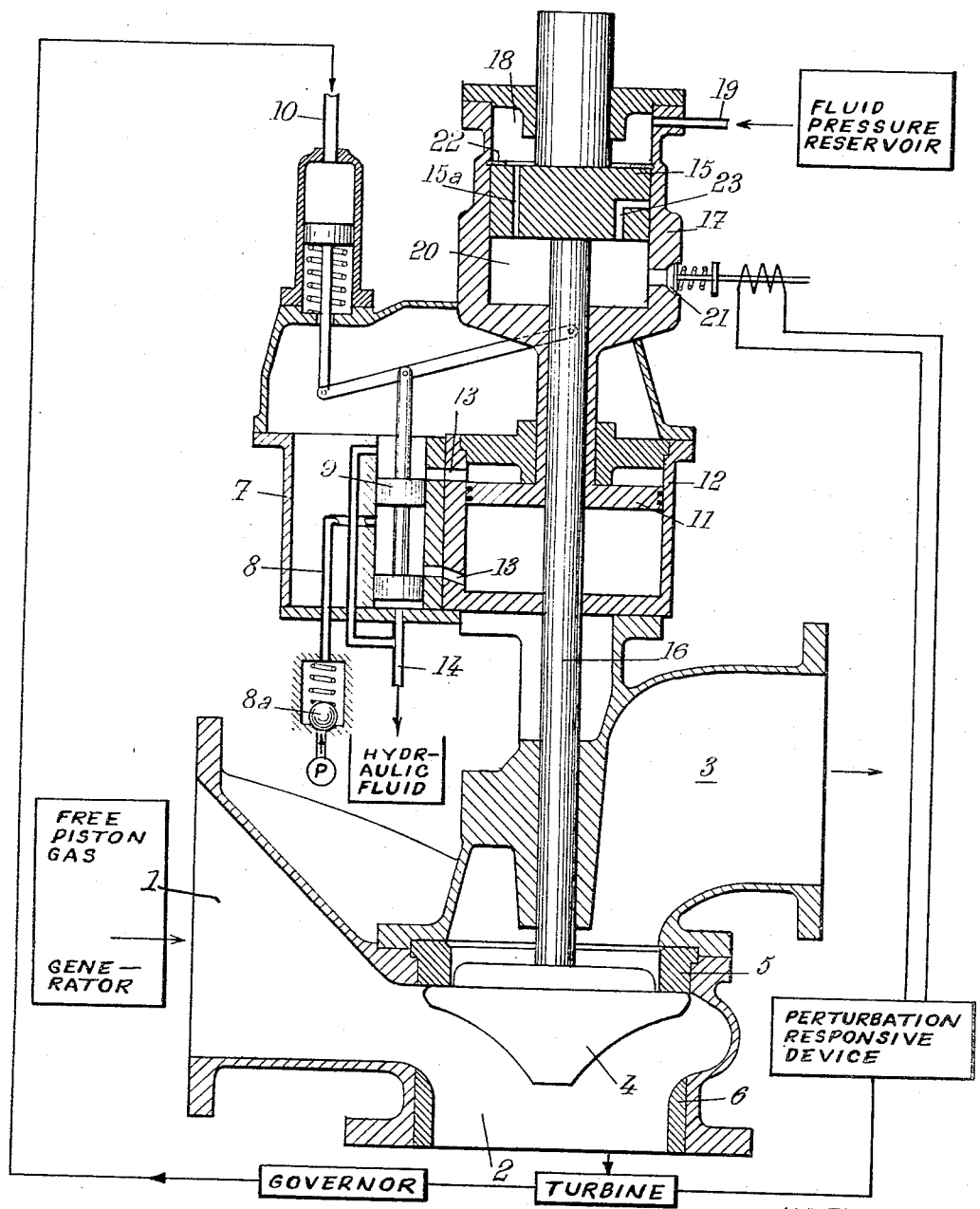

The present invention relates to the control of valves and more especially of gas turbine control valves, in particular in power plants where the hot gases under pressure for driving the turbine are supplied by free piston auto-generators.

The invention relates to devices comprising a valve member operated, for normal running conditions by first control means, preferably of the hydraulic type, capable of gradually shifting said valve from closed position to open position, and of keeping it in any intermediate position.

The object of the present invention is to provide a device of this kind which is better adapted to meet the requirements of practice than those known up to this time.

For this purpose, the valve is further subjected to the action of second control means, capable of acting independently of the first control means, said second control means being preferably of the pneumatic type, said second control means being capable of overcoming the action of the first control means and being intended to act, in case of disturbance in the operation, to bring the valve member suddenly into one of its end positions which it must occupy in such circumstances.

A preferred embodiment of the present invention will be hereinafter described with reference to the appended drawing, given merely by way of example, and in which:

The only figure diagrammatically shows a valve device for a gas turbine made according to the present invention.

The device according to the present invention is intended to permit of directing the hot gases under pressure arriving through a conduit 1, and supplied for instance by a set of free piston auto-generators, either toward a gas turbine through a conduit 2 or toward an exhaust conduit 3 opening to the atmosphere, or again partly toward said turbine and partly toward the atmosphere.

This device comprises a valve 4 movable between two end positions, to wit a first one, shown by the drawing; where said valve 4 is applied upon a seat 5 provided in the exhaust conduit 3, and another one where valve 4 is applied upon its seat 6 provided at the inlet of feed conduit 2 leading to the turbine. In intermediate positions, a portion of the gases from conduit 1 flows out through exhaust conduit 3 and another portion is fed through conduit 2 to the gas turbine.

Valve 4 is subjected to the action of first control means for giving it the desired position.

Said control means, shown at 7, comprise a conduit 8 for liquid under pressure, provided with a check valve 8a, leading to a slide valve 9, operated by a control circuit 10. In particular, this circuit 10 may be an oil circuit the pressure of which is varied by a device for regulating the running of the turbine, such as the governor shown at 16 in the Huber Patent No. 2,903,599.

Hydraulic control means 7 comprise a piston 11 mounted in a cylinder 12, into the ends of which open distributor passages 13, which may be brought into communication, one with the conduit 8 for feeding liquid under pressure, and the other with a delivery conduit 14, or vice versa. Piston 11 is connected to the valve 4 to be controlled in a manner which will be hereinafter explained.

According to the present invention, valve 4 is further subjected to the action of second control means, independent of the gradual action hydraulic control means just above described. Said second control means, preferably of the pneumatic type, is capable of overcoming the action of the first control means and is intended to act, controlled, for example, by an excess-speed-responsive device such as that shown at 51 in Huber Patent No. 2,903,599, in case of an exceptional perturbation likely to jeopardize the safety of the turbine, for suddenly bringing valve 4 into the end position thereof where feed conduit 2 is closed and exhaust conduit 3 is fully opened.

Said second control means is advantageously operated by an electric signal.

Said second control means must comply with the following conditions:

On the one hand, it does not interfere with the regulating action upon valve 4 of the hydraulic control means; and On the other hand, the presence of the hydraulic control means does not prevent the action of the pneumatic control means, which must be instantaneous and preponderating in case of transmission of the above mentioned signal.

According to another feature of the present invention, the piston 11 of the hydraulic control means and the piston 15 of the pneumatic control means are disposed coaxially with respect to each other along a control rod 16 which carries valve 4. The piston 15 of the pneumatic control means is rigid with said control rod 16, whereas the piston 11 of the hydraulic control means forms, together with the cylinder 17 of the pneumatic control means, a rigid system slidable with respect to control rod 16. Means are provided for causing the displacements of piston 11 to produce corresponding displacements of piston 15 and therefore of valve 4 rigid with said piston.

As shown by the drawing, the piston 15 of the pneumatic control means is a differential piston having its face of smaller area located in a chamber 18 permanently connected through a conduit 19, with a source of compressed air. The face of piston 15 of larger area forms one end wall of a chamber 20 adapted to be connected with the atmosphere through an electromagnetic control valve 21. Said valve 21 is operated by a detecting apparatus so as to be opened for a given time when an exceptional perturbation occurs which requires the operation of the pneumatic control means.

Displacement of piston 15 in the upward direction is limited by means of projection 22.

Electromagnetic control valve 21 is located at a level such that its communication with chamber 20 is closed by piston 15 as said piston is moving downwardly toward its lower position, a passage 23 formed in said piston 15 re-establishing the communication between chamber 20 and valve 21 when the piston is practically at the end of its downward stroke. Thus the end portion of the downward movement of piston 15 is braked by an air cushion which is finally evacuated through passage 23 and valve 21 when said piston 15 reaches the end of its downward stroke.

The device works in the following manner:

During normal operation, the air pressure is the same in chambers 18 and 20, respectively, and due to the differential character of piston 15, said piston is applied against abutment 22. As long as chamber 20 remains under pressure, the position of valve 4 is controlled by hydraulic control means 7, through piston 11, in accordince with the position given to slide valve 9 by the pressure existing in circuit 10.

As soon as an exceptional perturbation occurs, producing the opening of electromagnetic control valve 21, the pressure in chamber 20 becomes the atmospheric pressure and, whatever be the position then occupied by piston 11 and cylinder 17, rigid with said piston, the pressure existing in chamber 18 becomes preponderating, and suddenly drives piston 15 downwardly, thus causing valve 4 to be applied against its seat 6. The turbine is thus cut off. Furthermore, the end of the displacement of piston 15, rod 16 and valve 4 takes place without shock and passage 23 prevents rebounding.

As soon as valve 4 has come onto seat 6, the turbine is cut off and, with some delay, its regulator influences, through circuit 10, hydraulic control means 7 which restores piston 11 and cylinder 17 into the relative position they occupied precedingly with respect to piston 15. As soon as electromagnetic control valve 21 has been closed under the action of its return spring the compressed air pressure is gradually restored in chamber 20, through passage $15_a$, and piston 15 is again applied against abutment 22, thus causing valve 4 to reopen to a degree depending upon the position at this time of piston 11. Hydraulic means 7 then again assume control of the position of said valve 4.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What we claim is:

1. A power plant comprising at least one free piston gas generator producing gases under pressure, a gas driven turbine, conduit means for said gases under pressure connecting said free piston gas generator to said turbine, on the one hand, and to the atmosphere, on the other hand, valve means within said conduit to control the flow of gases respectively delivered to said turbine and to the atmosphere, first and second actuating parts for said valve means, said valve means being connected directly with said second actuating part, regulating means responsive to the speed of said turbine operative on said first actuating part, means independent of the turbine speed for subjecting said second actuating part to a difference of forces for holding said first and second actuating parts in a fixed relationship to each other, and control means, responsive to an exceptional perturbation affecting the turbine, to temporarily set out of operation the greater of said forces, the smaller of said forces then uncoupling said first and second actuating parts and driving said second actuating part together with said valve means to the position where the latter cuts off temporarily the supply of gases to said turbine, thereby giving said regulating means sufficient time to overcome said exceptional perturbation.

2. A power plant comprising a free piston gas generator producing gases under pressure, a gas driven turbine, a frame, conduit means in said frame connecting said gas generator, on the one hand, to said turbine and, on the other hand, to an exhaust to atmosphere, valve means within said conduit means to control the flows of gases respectively delivered to said turbine and to the atmosphere, a seat within said conduit for said valve when the latter cuts off the supply of said gas generator to said turbine, a valve rod rigid with said valve, a first cylinder coaxially surrounding said rod and fixed with respect to said frame, a first piston fitting slidably in said first cylinder, said first piston being slidable along said rod, hydraulic control means responsive to the speed of said turbine for controlling the position of said piston in said cylinder, a second cylinder rigid with said first piston and surrounding a portion of said rod, a second piston rigid with said rod and fitting slidably in said second cylinder, abutment means in said second cylinder, and second control means comprising means for subjecting said piston, on both faces, to a difference of forces tending to hold said piston against said abutment means, thereby normally maintaining said second piston and said second cylinder in a fixed relationship, and emergency means for temporarily rendering the greater of said forces inoperative, responsive to a sudden perturbation in the load on the turbine, for suddenly driving said second piston from said abutment means in the direction where it applies said valve on said seat to cut off the gas supply to said turbine.

3. A power plant according to claim 2, wherein said second piston is a differential piston, provided with a restricted passage from one side thereof to the other, dividing said second cylinder into two chambers, a first one on the side of the greater face of said differential piston and a second one on the side of the smaller face of said differential piston, said abutment means comprising an internal abutment for said piston in said second chamber and wherein said second control means are constituted by pneumatic control means which comprise an inlet for air under pressure into said second chamber, said air under pressure urging said differential piston against said abutment under the difference between the forces exerted on both faces of said differential piston, and said emergency means comprising an air outlet controlled by an emergency valve in said first chamber which opens responsive to an exceptional perturbation of the load on said turbine, thereby causing the removal of said piston from said abutment within said second cylinder and the driving of said valve towards it seat.

4. A power plant according to claim 2 wherein said second piston is further provided with a passage opening, on the one hand, in its bottom face and, on the other hand, in its sliding surface, this last opening coming into register with said outlet in said second chamber when said emergency valve is open, said passage permitting the damping of the motion of said second piston when the same ends its stroke.

References Cited by the Examiner

UNITED STATES PATENTS

| | | | |
|---|---|---|---|
| 2,969,042 | 1/1961 | Litz et al. | 91—167 |
| 3,035,549 | 5/1962 | Hewitt | 91—167 |

FOREIGN PATENTS 402,662  12/1933  Great Britain.

EDGAR W. GEOGHEGAN, *Primary Examiner.*

PAUL E. MASLOUSKY, *Examiner.*